Nov. 2, 1937.  E. W. PARK  2,097,841
TRACTOR PLOW
Original Filed May 19, 1936  2 Sheets-Sheet 1
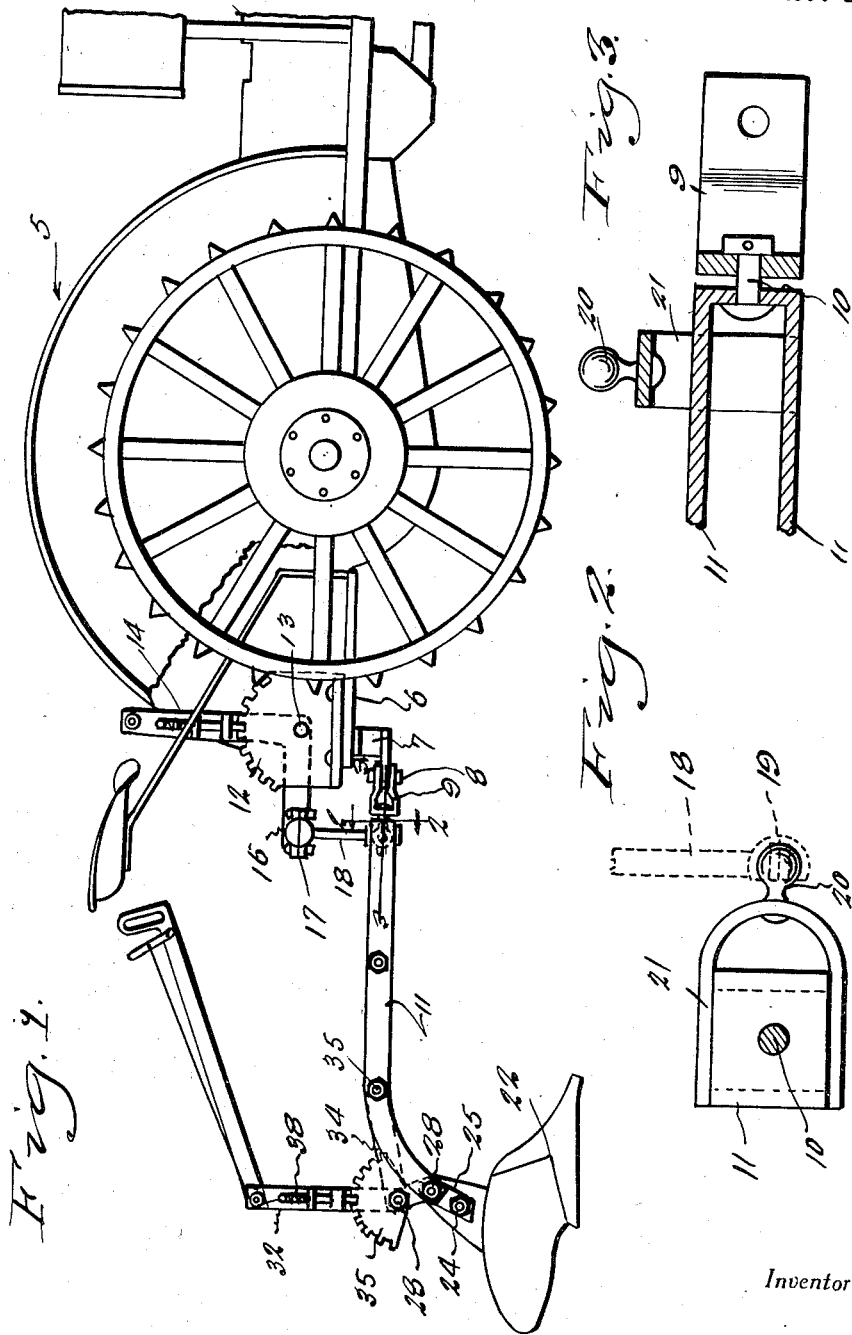
Inventor
Elmer W. Park
By Clarence A. O'Brien
Hyman Berman
Attorneys

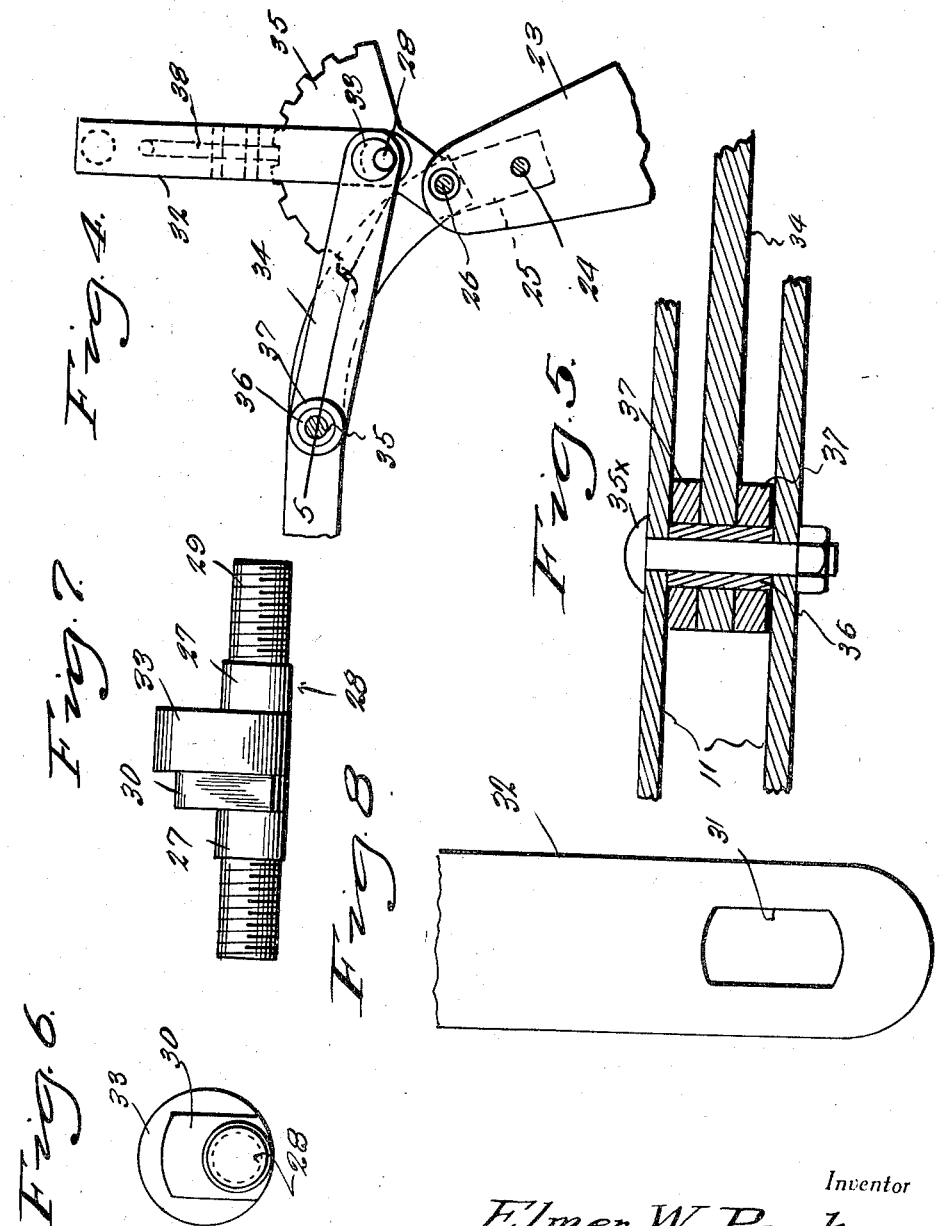

Patented Nov. 2, 1937

2,097,841

UNITED STATES PATENT OFFICE 2,097,841

TRACTOR PLOW

Elmer William Park, near Fredericksburg, Va.

Continuation of application Serial No. 80,590, May 19, 1936. This application February 12, 1937, Serial No. 125,520

2 Claims. (Cl. 97—47)

This application is a continuation of my application Serial No. 80,590, filed May 19, 1936, which has become abandoned.

This invention relates to a plow and the object of the invention is to provide a plow which may be readily and quickly attached to the draw bar of a tractor.

More particularly the invention is concerned with improved means for connecting the plow beam with the draft bar in a manner to permit the beam to be rocked or rotated either to the right or left for varying the angle of the beam with respect to the perpendicular, and also with improved means for adjusting the plow relatively to its beam for controlling the digging depth of the plow.

The invention together with its objects and advantages will be best understood from a study of the following description taken in connection with the accompanying drawings wherein:—

Figure 1 is a side elevational view illustrating the application of the invention to a tractor.

Figures 2 and 3 are detail sectional views taken substantially on the lines 2—2 and 3—3, respectively, of Figure 1.

Figure 4 is a fragmentary enlarged detail view partly in section and partly in elevation illustrating the means for adjusting the plow relative to its beam.

Figure 5 is a detail sectional view taken substantially on the line 5—5 of Figure 4.

Figure 6 is an edge elevational view of an eccentric equipped bolt.

Figure 7 is a side elevational view of the bolt.

Figure 8 is a side elevational view of the lower portion of a hand lever forming part of the mechanism shown in Figure 4.

Referring to the drawings by reference numerals it will be seen that 5 indicates generally the gear portion of a tractor which latter is provided with the usual draw bar 6.

In accordance with the present invention there is suitably secured in the draw bar 6 any suitable type of bracket 7. Pivoted to the bracket 7 as at 8 is a substantially U-shaped yoke 9 to which is swivelly connected as at 10 one end of a plow beam 11.

The plow beam 11 is substantially U-shaped and at its closed end is connected through the medium of the bolt 10 with the yoke 9 in a manner to permit the beam 11 to be tilted either to the right or left relatively to the yoke 9.

For rocking the beam 11 either to the right or left there is suitably mounted on the draft bar 6 a rack segment 12 to which is pivoted as at 13 a hand lever 14 equipped with a detent 15 for cooperation with the segment 12 to secure the lever 14 at the desired adjustment.

Lever 14 at the point 13 has an arm extension 16 equipped with a laterally disposed ball that is engaged in a socket on one end of a rod 18. On the opposite end thereof rod 18 is equipped with a suitable socket structure 19 that is engaged with a ball 20 on the closed end of a U-shaped bracket 21 which straddles the beam 11 from one side thereof and is suitably secured to the beam in any suitable manner as by being welded thereto. (See Figures 1, 2 and 3.) It will thus be seen that by rocking the lever 14 beam 11 will be rocked either to the right or left for placing the plow 22 provided on the free end of the beam 11 in a manner hereinafter set out, at the desired angle to the perpendicular. Thus it will be seen that the plow 22 may be tilted quickly and easily and held at the desired tilted position.

The plow 22 has integral with or otherwise fixedly secured to the share thereof an attaching flange 23 to which is bolted or otherwise secured as at 24 bracket arms 25 disposed at opposite sides of the flange 23.

Arms 25 and the flange 23 are pivoted to the ends of the sides of the beam 11 through the medium of a pivot bolt 26.

Also arms 25 above the pivot 26 have angularly disposed extensions which are apertured to receive the smooth or non-threaded portions 27 of a bolt 28 such as shown in Figure 7.

Bolt 28 has threaded ends 29 to receive nuts or the like for securing the bolt between said angular ends of the arms 25.

Bolt 28 is also formed integrally with a substantially rectangular part 30 which fits in a correspondingly shaped opening 31 provided in a hand lever 32 whereby rotative movement of the lever 32 is transmitted to the bolt 28 for turning the latter.

Adjacent the part 30 thereof bolt 28 is provided with an eccentric 33 with which is engaged one end of a link 34 the other end of which is pivoted between the sides of the beam 11 through the medium of a bolt 35x that extends between the sides of the beam 11 and is provided with a spacer sleeve 36. Disposed on the sleeve 36 between the link 34 and the sides of the beam 11 are washers or spacer disks 37 all of which is clearly shown in Figure 5.

From the above it will be seen that when lever 32 is rocked a swinging movement will be transmitted to the plow 22 for swinging the latter in a vertical plane either to tilt the point of the plow downwardly to the extent desired or to raise said point as may be desired for controlling the digging depth of the plow.

The plow 22 is secured at the desired vertical adjustment through the medium of a detent 38 with which lever 32 is equipped and which cooperates with a rack segment 35 provided on one of the bracket arms 25 as shown in Figures 1 and 4.

It will thus be seen that by the operation of the lever 14 the angle of the plow 22 may be varied as found desirable while by operating the lever 32 the digging depth of the plow, that is the angle of the nose or point of the plow may be adjusted perpendicularly with respect to the ground as found desirable.

It will be apparent from the foregoing that the devices disclosed are especially adapted for attaching a hillside or reversing plow to a garden tractor; also, that the ball and socket connections conduce to great flexibility in turning.

The tractor seat and seat support shown in Figure 1 are not comprised in my invention and, therefore, may be altogether omitted without affecting the same.

Having thus described the invention, what is claimed as new is:—

1. In the plow improvement described and in combination, a plow having an upstanding flange, a plow beam, bracket arms fixed to and extending upwardly from said flange of the plow, one of said arms having an upstanding segmental rack fixed thereto, a lever alongside said rack and having an angular opening in its end portion and also having a detent complementary to said rack, a transverse bolt journaled and secured in position in said bracket arms and having between said arms and alongside each other an eccentric and an angular part, the latter disposed in the angular opening of the lever, and a link having a circular opening receiving said eccentric, said link extending forwardly from the eccentric and pivotally connected to the beam at an intermediate point in the length of the latter.

2. In the plow improvement described and in combination, a plow having an upstanding flange, a plow beam, bracket arms fixed to and extending upwardly from said flange of the plow, one of said arms having an upstanding segmental rack fixed thereto, a lever alongside said rack and having an angular opening in its end portion and also having a detent complementary to said rack, a transverse bolt journaled and secured in position in said bracket arms and having between said arms and alongside each other an eccentric and an angular part, the latter disposed in the angular opening of the lever, and a link having a circular opening receiving said eccentric, said link extending forwardly from the eccentric and pivotally connected to the beam at an intermediate point in the length of the latter; the said plow beam being turnable about its axis, draft means, a connection between the plow beam and draft means permitting of said turning of the beam, manually operable means carried by the draft means and connected with the plow beam for said turning of the latter and means for adjustably fixing said manually operable means.

ELMER WILLIAM PARK.